US012679286B2

(12) United States Patent
Salter et al.

(10) Patent No.: US 12,679,286 B2
(45) Date of Patent: Jul. 14, 2026

(54) VEHICLE PANEL AND VIEWING SCREEN

(71) Applicant: Ford Global Technologies, LLC, Dearborn, MI (US)

(72) Inventors: Stuart C. Salter, White Lake, MI (US); Omar Valdez, Cuautitlan Izcalli (MX); Mark Joseph Courtright, Allen Park, MI (US); Brendan Diamond, Grosse Pointe, MI (US); Heath W. Hilliard, Royal Oak, MI (US); Jason Daniel Falenski, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 18/374,097

(22) Filed: Sep. 28, 2023

(65) Prior Publication Data

US 2025/0108767 A1    Apr. 3, 2025

(51) Int. Cl.
| | |
|---|---|
| *B60R 11/02* | (2006.01) |
| *B60R 13/01* | (2006.01) |
| *B62D 25/12* | (2006.01) |
| *E05D 15/40* | (2006.01) |
| *E05F 15/00* | (2015.01) |
| *B60R 11/00* | (2006.01) |

(52) U.S. Cl.
CPC ........ *B60R 11/0235* (2013.01); *B60R 13/011* (2013.01); *E05D 15/40* (2013.01); *E05F 15/00* (2013.01); *B60R 2011/0085* (2013.01); *B62D 25/12* (2013.01); *E05Y 2900/536* (2013.01)

(58) Field of Classification Search
CPC .......... B60R 5/02; B60R 5/04; B60R 13/011; B60R 2011/0085; B60R 11/0235; E05Y 2900/536; B62D 25/10; B62D 25/105; B62D 25/12
See application file for complete search history.

(56) References Cited

U.S. PATENT DOCUMENTS

| | | | | |
|---|---|---|---|---|
| 6,682,118 | B2 * | 1/2004 | Ryan | B60R 13/01 296/37.16 |
| 10,434,847 | B2 * | 10/2019 | Yoshizumi | G09G 3/20 |
| 12,103,495 | B2 * | 10/2024 | Harmon | B60N 2/7011 |
| 2004/0046899 | A1 * | 3/2004 | Bonnett | B60R 11/0211 348/744 |
| 2004/0086259 | A1 | 5/2004 | Schedivy | |
| 2004/0189947 | A1 * | 9/2004 | Hattori | G03B 21/58 353/13 |
| 2004/0212746 | A1 | 10/2004 | Rosen | |
| 2006/0238967 | A1 * | 10/2006 | Carson | B60R 11/0235 361/679.04 |
| 2009/0096941 | A1 * | 4/2009 | Chen | B60R 11/0235 348/837 |

(Continued)

FOREIGN PATENT DOCUMENTS

| | | |
|---|---|---|
| CN | 201146041 Y | 11/2008 |
| JP | S6139781 A | 2/1986 |

*Primary Examiner* — Gregory A Blankenship
(74) *Attorney, Agent, or Firm* — Vichit Chea; Carlson, Gaskey & Olds, P.C.

(57) ABSTRACT

A method and apparatus includes a vehicle panel that is moveable between a closed position and an open position and a viewing screen that is supported relative to an inner surface of the vehicle panel. The viewing screen is moveable between an internal viewing position and an external viewing position when the vehicle panel is in the open position.

26 Claims, 5 Drawing Sheets

(56)                     References Cited

U.S. PATENT DOCUMENTS

| | | | |
|---|---|---|---|
| 2010/0102942 A1 | 4/2010 | Bisinger et al. | |
| 2011/0038110 A1* | 2/2011 | Ikunami | G09F 21/04 |
| | | | 361/679.01 |
| 2012/0126581 A1* | 5/2012 | Rocheblave | B62D 25/12 |
| | | | 296/193.11 |
| 2012/0268665 A1* | 10/2012 | Yetukuri | B60K 35/22 |
| | | | 348/837 |
| 2017/0349098 A1* | 12/2017 | Uhm | B60K 35/53 |
| 2019/0039501 A1* | 2/2019 | Hemphill | B60P 3/0255 |
| 2019/0152402 A1* | 5/2019 | Domnik | B60J 3/0278 |
| 2019/0337439 A1* | 11/2019 | Tadros | B60R 11/0235 |
| 2020/0130750 A1* | 4/2020 | Glickman | E05F 15/76 |
| 2021/0129642 A1* | 5/2021 | Hickey | E05F 1/1292 |
| 2022/0198518 A1* | 6/2022 | Prozzi | G06Q 30/0265 |
| 2022/0317767 A1* | 10/2022 | Zhang | B60K 35/22 |
| 2023/0079042 A1 | 3/2023 | Yamazaki et al. | |
| 2023/0373301 A1* | 11/2023 | Elder | B60K 35/00 |
| 2023/0391268 A1* | 12/2023 | Harmon | B60R 19/52 |
| 2023/0393455 A1* | 12/2023 | Harmon | B60R 11/0235 |
| 2024/0048674 A1* | 2/2024 | Mohar Castillo | B60R 11/00 |
| 2024/0075883 A1* | 3/2024 | Salter | B60R 5/02 |
| 2024/0109499 A1* | 4/2024 | Stiehl | B60K 35/53 |
| 2024/0310628 A1* | 9/2024 | Van Wiemeersch | |
| | | | H04N 9/3185 |
| 2024/0399860 A1* | 12/2024 | Diamond | G02B 5/32 |
| 2025/0108767 A1* | 4/2025 | Salter | B60R 11/0235 |

* cited by examiner

VEHICLE PANEL AND VIEWING SCREEN

TECHNICAL FIELD

This disclosure relates generally to a vehicle panel with a viewing screen, more particularly, to a vehicle panel associated with an internal compartment where the viewing screen is moveable between an internal viewing position and an external viewing position.

BACKGROUND

Vehicles have increasing use as mobile offices. Incorporation of additional workplace features can further enhance such use.

SUMMARY

An apparatus according to an exemplary aspect of the present disclosure includes, among other things: a vehicle panel moveable between a closed position and an open position; and a viewing screen supported relative to an inner surface of the vehicle panel, wherein the viewing screen is moveable between an internal viewing position and an external viewing position when the vehicle panel is in the open position.

In a further non-limiting embodiment of the foregoing apparatus, the apparatus includes a coupling mechanism to attach the vehicle panel to a vehicle structure such that, when the vehicle panel is in the open position, the vehicle panel is moveable to a first position for the internal viewing position and a second position for the external viewing position, the first position being different than the second position.

In a further non-limiting embodiment of any of the foregoing apparatus, the coupling mechanism includes a first coupler on one side of the vehicle panel and a second coupler on an opposite side of the vehicle panel.

In a further non-limiting embodiment of any of the foregoing apparatus, the first coupler and the second coupler comprise linkage assemblies with one or more power strut actuators.

In a further non-limiting embodiment of any of the foregoing apparatus, the apparatus includes a screen pivot coupling the viewing screen to the vehicle panel such that the viewing screen is moveable amongst a plurality of viewing positions.

In a further non-limiting embodiment of any of the foregoing apparatus, when in the internal viewing position, the viewing screen is moveable via the screen pivot between at least an upright position and a reclined position that is non-parallel with the upright position, and when in the external viewing position, the viewing screen is moveable via the screen pivot to an outward facing position.

In a further non-limiting embodiment of any of the foregoing apparatus, when in the internal viewing position, the viewing screen has a lower edge, and wherein when the viewing screen is pivoted from the upright position to the outward facing positions the lower edge of the screen becomes the upper edge.

In a further non-limiting embodiment of any of the foregoing apparatus, occupant height is measured, and wherein screen tilt angle and/or occupant location position is automatically adjusted to align the viewing screen with an occupant face, or screen tilt angle is automatically adjusted to align the viewing screen with an occupant face in response to detecting a reclined position for an occupant.

In a further non-limiting embodiment of any of the foregoing apparatus, the screen pivot comprises a powered actuator.

In a further non-limiting embodiment of any of the foregoing apparatus, the vehicle panel encloses a compartment when in the closed position.

In a further non-limiting embodiment of any of the foregoing apparatus, the vehicle panel comprises a trunk or frunk.

In a further non-limiting embodiment of any of the foregoing apparatus, the inner surface of the vehicle panel comprises a non-reflective surface, and/or wherein the surface area of the compartment is coated with a liner material that withstands external weather conditions.

In a further non-limiting embodiment of any of the foregoing apparatus, the apparatus includes a rigid cover overlapping a viewing surface of the viewing screen when the vehicle panel is in the closed position, and wherein the rigid cover is selectively removeable when the vehicle panel is in the open position.

A method according to another exemplary aspect of the present disclosure includes, among other things: moving a vehicle panel between a closed position and an open position; supporting a viewing screen relative to an inner surface of the vehicle panel; and selectively moving the viewing screen between an internal viewing position and an external viewing position when the vehicle panel is in the open position.

In a further non-limiting embodiment of the foregoing method, the method further includes coupling the vehicle panel to a vehicle structure, moving the vehicle panel to a first open position to provide the internal viewing position, and moving the vehicle panel to a second open position to provide the external viewing position, the first open position being different from the second open position.

In a further non-limiting embodiment of any of the foregoing methods, the method further includes coupling one side of the vehicle panel to the vehicle structure with a first coupling mechanism and coupling an opposite side of the vehicle panel to the vehicle structure with a second coupling mechanism.

In a further non-limiting embodiment of any of the foregoing methods, the method further includes coupling the viewing screen to the vehicle panel with a screen pivot that allows the viewing screen to be pivoted at least 90 degrees relative to an inner surface of the vehicle panel to provide a plurality of different viewing positions.

In a further non-limiting embodiment of any of the foregoing methods, the method further includes measuring occupant height, and automatically adjusting screen tilt angle and/or automatically adjusting occupant location position to align the viewing screen with an occupant face, or automatically adjusting screen tilt angle to align the viewing screen with an occupant face in response to detecting a reclined position for an occupant.

In a further non-limiting embodiment of any of the foregoing methods, the method further includes covering the inner surface of the vehicle panel with a non-reflective material, and/or coating a surface of the storage compartment area with a liner material that withstands external weather conditions.

In a further non-limiting embodiment of any of the foregoing methods, the method further includes overlaying a rigid cover over a viewing surface of the viewing screen when the vehicle panel is in the closed position, and selectively removing the rigid cover when the vehicle panel is in the open position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle panel, e.g. a trunk or frunk, with a viewing screen, where the viewing screen is selectively moveable between an internal viewing position and an external viewing position.

Figure 1A:
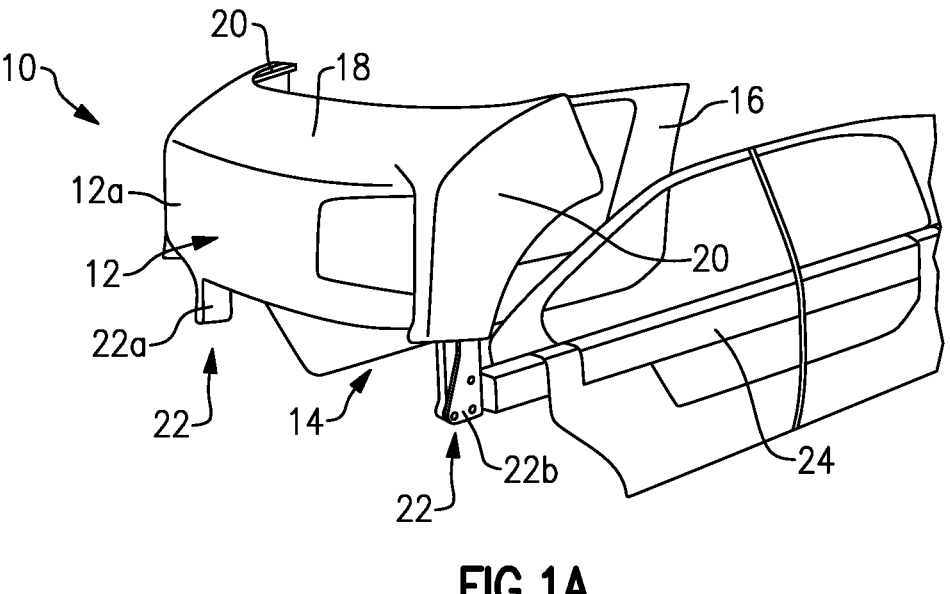
FIG. 1A is a perspective view of one example of a vehicle panel according to the subject disclosure.
Figure 1B:
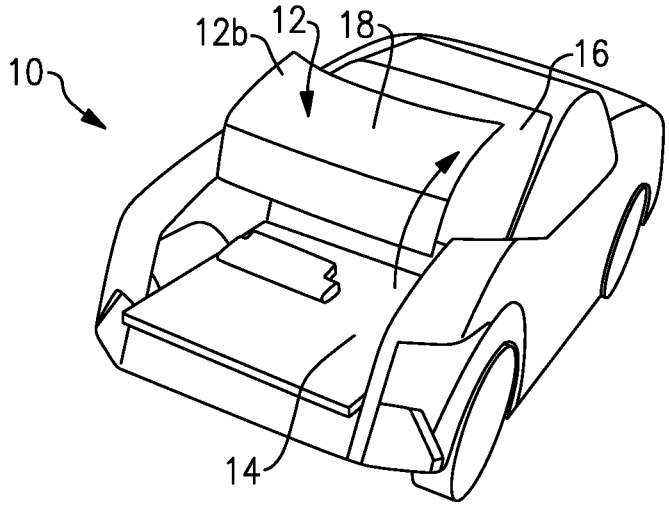
FIG. 1B is a perspective view of another example of a vehicle panel according to the subject disclosure.

With reference to FIGS. 1A-1B, a vehicle 10 includes a vehicle panel 12 that encloses a storage or cargo area 14. The vehicle panel 12 is moveable between a closed position and an open position. FIGS. 1A-B show the vehicle panel 12 in the open position where an inner surface of the panel faces a vehicle windshield area 16, for example. The vehicle panel 12 can comprise a trunk, frunk, rear lift panel, or any other type of moveable panel. FIG. 1A shows an example where the vehicle panel 12 comprises a frunk 12a with a hood 18 and fenders 20. FIG. 1B shows an example of a frunk 12b where there is only the hood 18 that is movable, which provides a reduced weight configuration.

In one example, a coupling mechanism 22 (FIG. 1A and FIG. 3) is used to attach the vehicle panel 12 to a vehicle structure 24. In one example, the vehicle structure 24 comprises a rigid rail or beam that extends along a longitudinal length of the vehicle. Other rigid vehicle structural members could also be used to mount the vehicle panel 12, such as an upper front radiator support for example.

In one example, a viewing screen 50 (FIG. 4) is supported relative to an inner surface 26 of the vehicle panel 12. The viewing screen 50 is moveable between an internal viewing position (FIGS. 5A-5B) and an external viewing position (FIG. 6) when the vehicle panel 12 is in the open position. The viewing screen 50 can only be used when the vehicle 10 is stationary. The panel 12 will only open when vehicle 10 is in park and the vehicle 10 will not go into drive unless the panel 12 is lowered. In one example, the coupling mechanism 22 (FIG. 3) allows the vehicle panel 12 to move to different open positions to provide internal and external viewing of the viewing screen 50. In one example, the coupling mechanism includes a first coupler 22a on one side of the vehicle panel 12 and a second coupler 22b on an opposite side of the vehicle panel 12. In one example, the couplers 22a, 22b are located along longitudinally extending sides of the vehicle panel 12.

Figure 2:
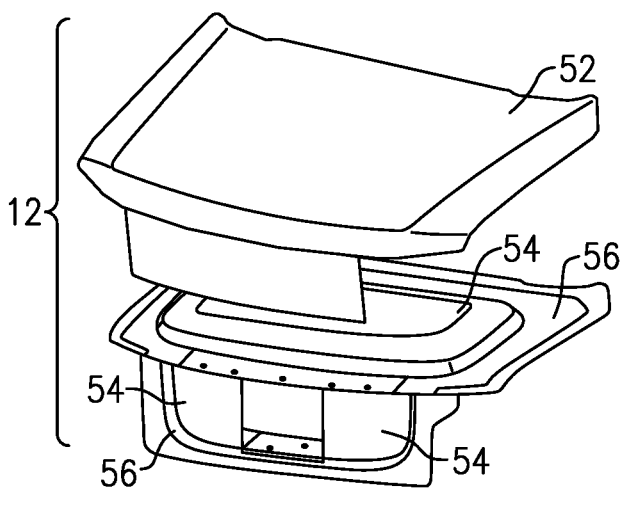
FIG. 2 is an exploded view of another example of a vehicle panel according to the subject disclosure.

FIG. 2 shows one example of a panel structure for the vehicle panel 12 that is configured to support the viewing screen 50. A lightweight outer panel 52 is attached to a structural lightweight inner panel 54. The structural lightweight inner panel 54 includes high strength reinforcements that comprise a ring 56 that provides a load path between the screen mounting, hood hinges and securement structures.

Figure 3:
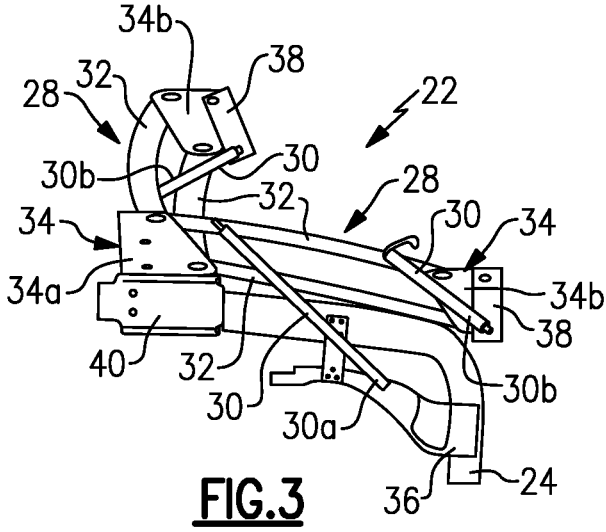
FIG. 3 is a schematic representation of one example of a coupling mechanism used to connect the vehicle panel to a vehicle structure.

In one example show in FIG. 3, the first coupler 22a and the second coupler 22b each comprise a linkage assembly 28 with one or more power strut actuators 30 to allow the panel 12 to rotate/pivot to a desired position. For example, a dual power strut system lifts the panel 12 and screen 50 automatically to a desired position and locks it there such that it can be held steady despite environmental conditions, e.g. air/wind, while a six-bar link system pivots a hinge down and forward on the vehicle 10 to allow the panel 12 and screen 50 to travel so the panel 12 opens more than a traditional hood system along a Z-axis. In one example, a user will operate the panel 12 and screen 50 from a console, key fob, exterior switch, etc. to activate the power strut actuators to move the panel 12 and to move the screen 50 to a desired display position.

Figure 4:
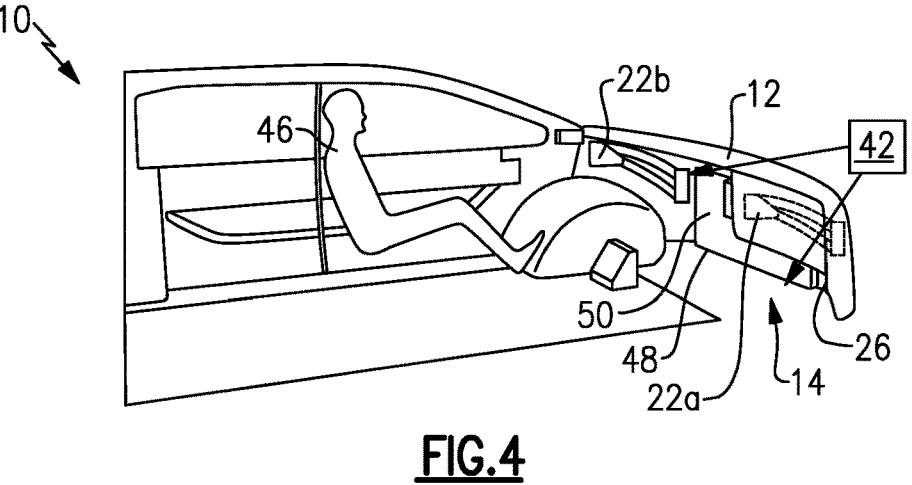
FIG. 4 is a schematic representation of a vehicle panel and viewing screen in a vehicle panel closed position with a securement system.

In one example, the linkage assembly 28 includes a plurality of bars 32 coupled to hinges 34. In one example, the bars 32 are made of high strength steel tubes to reduce deflection due to high loads. A first bracket 36 couples one end of a first power strut actuator 30a to the vehicle structure 24 and the second end of the first power strut actuator 30a is coupled to one of the bars 32. A second bracket 38 couples one end of a second power strut actuator 30b to the vehicle panel 12 and the second end of the second power strut actuator 30b is coupled to one of the bars 32. In one example, the bars 32 comprise a pair of bars that extend generally parallel to each other. In one example, the second ends of the power strut actuators 30a, 30b are connected to the same bar 32, e.g. an upper bar of the pair of bars as shown when the panel 12 is in the closed position. A first hinge 34a is associated with the vehicle structure 24 and a second hinge 34b is associated with the panel 12. The first hinge 34a is fixed into a hydroformed tube 40 associated with the vehicle structure 24 for reinforcement. As shown in FIGS. 4-6, there is one linkage assembly on each side of the panel 12.

FIG. 3 shows the linkage assembly 28 in a first position, e.g. panel lowered/closed position, where the bars 32 are generally parallel with the longitudinally extending vehicle rail structure 24, and a second position, e.g. panel raised/open position, where the bars are in a vertically extending position.

The disclosed linkage and power strut coupling mechanism is just one example of a coupling structure used to connect the panel to the vehicle structure. Those skilled in the art who have the benefit of this description will be able to determine other types of coupling mechanisms and structures that could be used to connect these structures together.

FIG. 4 shows an example of the vehicle panel 12 in the closed position and the coupling mechanisms 22a, 22b in the lowered position. A dual power securement mechanism 42 is used to securely hold the panel 12 in place during travel. The use of the securement mechanism 42 also allows the components attached to the inner surface 26 of the panel 12 to remain steady in response to road inputs. As shown in one example in FIG. 4, the securement mechanism 42 connects at two locations, with the first location being at the forward end of the panel 12 near the center and the second location being at a rearward location of the panel 12 near the windshield area 16. The dual power securement mechanism 42 is schematically shown because any type of securement mechanism can be used. Those skilled in the art who have the benefit of this description will be able to determine the appropriate type of securement mechanism needed.

Figure 5A:
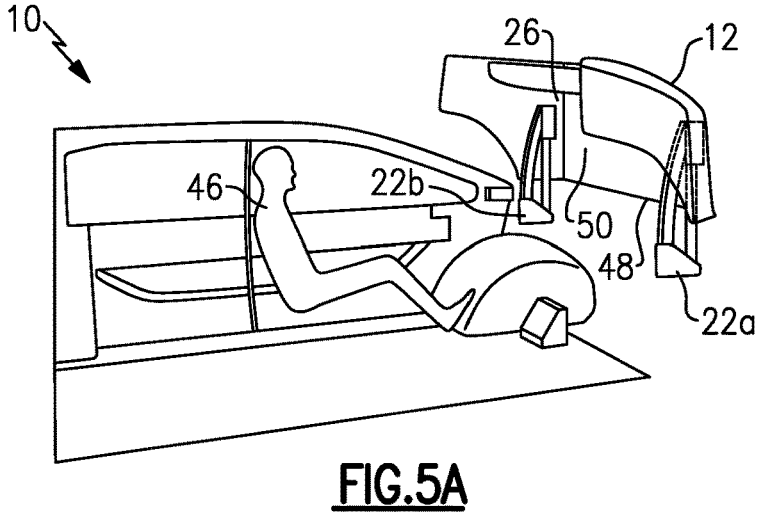
FIG. 5A is a schematic representation of the vehicle panel and viewing screen of FIG. 4 in a vehicle panel open position and a viewing screen internal viewing position.
Figure 5B:
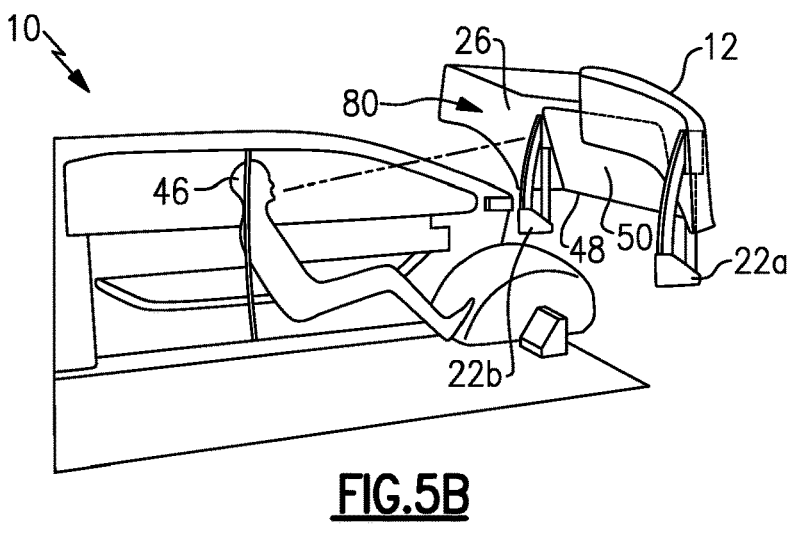
FIG. 5B is a view similar to FIG. 5A but showing a modified orientation of the viewing screen.
Figure 6:
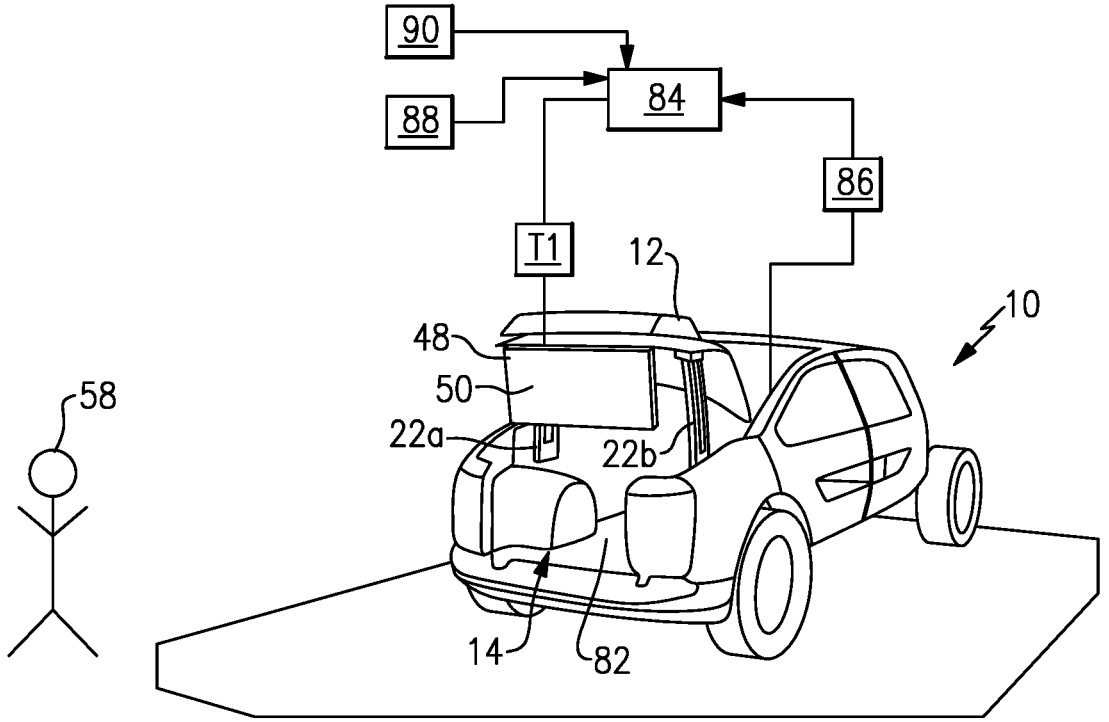
FIG. 6 is a schematic representation of the vehicle panel and viewing screen of FIG. 4 in a vehicle panel open position and a viewing screen external viewing position.

FIG. 5A shows the vehicle panel 12 of FIG. 4 in a raised position to display the viewing screen 50 in the internal viewing position. This this position, one or more vehicle occupants 46 can easily see the screen 50 while positioned within the vehicle 10. FIG. 5B is the same as FIG. 5A but shows the screen 50 in a reclined, tipped, or angled position to facilitate viewing by the occupants 46.

FIG. 6 shows the vehicle panel 12 in a raised position to display the viewing screen 50 in the external viewing position for an external user 58. In this position, the screen 50 is flipped down about a lower edge 48 of the screen 50 as shown in FIG. 5B such that the lower edge 48 becomes the upper edge of the screen 50 as shown in FIG. 6. Also, at least two different screen heights are provided. In one example, there is a lower position where the panel 12 is in a first open position and the screen 50 just rotates/flips down to accommodate a close outside position, and there is a higher position where the panel 12 rotates further upward to a second open position that takes the screen 50 higher to accommodate a standing position for better viewing from a distance.

In one example, an entirety of an inner surface of the vehicle panel 12 comprises a non-reflective surface as indicated at 80 in FIG. 6. Additionally, the linkage assembly components may be coated with matt black to reduce any reflection to the screen 50. Additionally, in one example, a surface 82 of the compartment 14 is coated with a liner material capable of withstanding external weather conditions.

In one example, a screen pivot 60 (FIG. 7) couples the viewing screen 50 to the vehicle panel 12 such that the viewing screen 50 is moveable amongst a plurality of viewing positions. In one example, the screen pivot 60 is located near a center of the viewing screen 50 along an upper or lower edge of the viewing screen when the vehicle panel 12 is in the closed position. In one example, the screen pivot 60 comprises a powered actuator 62, such as a stepper motor for example, that is held fixed to the panel 12 via a mount 64. The motor 62 drives an output 66 associated with the screen 50 to move the screen 50 between different display positions.

In one example, the powered actuator 62 is mounted on the reinforced hood inner zone 54/56 (FIG. 2). By executing the powered actuator 62 at the screen hinge pivot, it allows the user to adjust the screen 50 in all modes.

Figure 7:
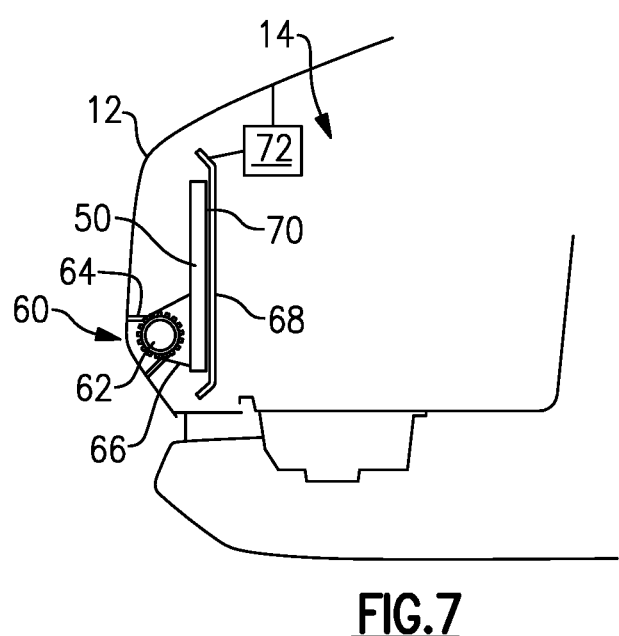
FIG. 7 is a schematic representation of the vehicle panel and viewing screen of FIG. 4 in a vehicle panel closed position with a screen cover and screen pivot.

FIG. 7 shows the vehicle panel 12 in the closed position where the panel 12 encloses the storage compartment 14. In one example, a rigid cover 68 overlaps a viewing surface 70 of the viewing screen 50 when the vehicle panel 12 is in the closed position. The cover 68 comprises a screen rigid lid that is mounted on the panel 12 to protect the screen 50 from water and to prevent contact against the screen 50 from items stored the compartment 14. The rigid cover 68 is selectively removeable when the vehicle panel 12 is in the open position. The cover 68 can be completely removed or pivoted to a non-overlapping position Any type of mounting structure 72 (FIG. 7) can be used to attach cover 68 to the panel 12.

Figure 8:
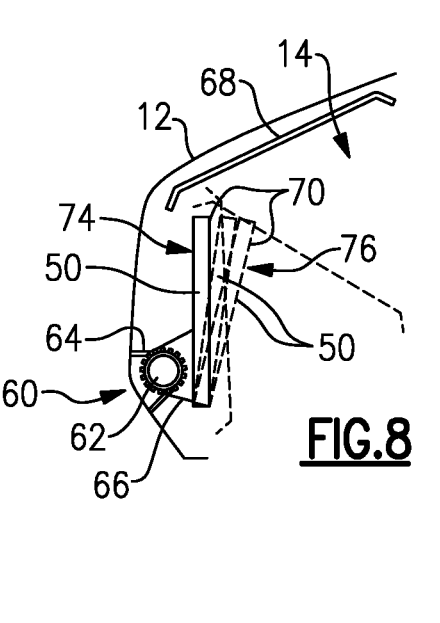
FIG. 8 is a schematic representation of the vehicle panel and viewing screen of FIG. 7 in a vehicle panel open position and a viewing screen internal viewing position.

FIG. 8 shows the panel 12 in a first open position for internal viewing for users 46 positioned within the vehicle 10. The rigid cover 68 is removed or rotated to a stowed position against the inner surface 26 of the panel 12 as shown. In this example, when in the internal viewing position, the viewing screen 50 is moveable via the screen pivot 60 between at least an upright position 74 and a reclined position 76 that is non-parallel with the upright position 74. The reclined position 76 can comprise a plurality of discrete reclined positions as indicated by the dashed lines.

Figure 9:
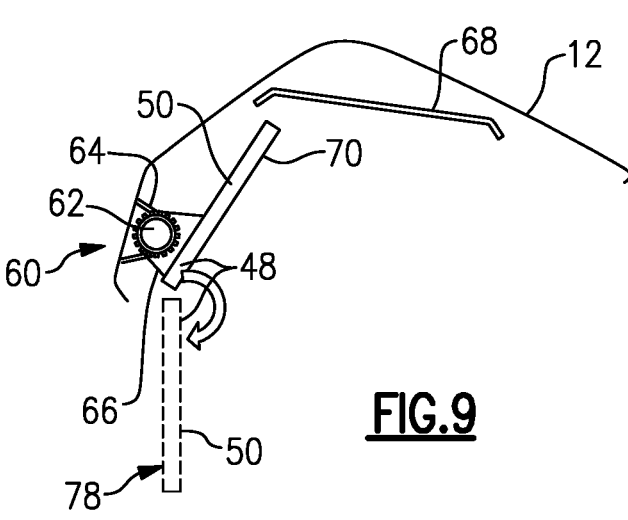
FIG. 9 is a schematic representation of the vehicle panel and viewing screen of FIG. 7 in a vehicle panel open position and a viewing screen external viewing position.

FIG. 9 shows the panel 12 in a second open position, different than the first open position of FIG. 8, for external viewing by users 58 outside the vehicle 10. The rigid cover 68 is removed or rotated to a stowed position against the inner surface 26 of the panel 12 as shown. In this example, when in the external viewing position, the viewing screen 50 is moveable via the screen pivot 60 to an outward facing position 78 that extends below the panel 12. In this example, the screen pivots via the screen pivot 60 such that the lower edge 48 of the screen 50 in the internal viewing position becomes the upper edge 48 of the screen 50 in the external viewing position. In one example, this is accomplished by pivoting the screen 50 by at least 90 degrees when moving from the upright position to the outward facing position. In one example, the screen 50 is pivoted at least 180 degrees.

In one example, a method includes moving a vehicle panel 12 between a closed position and an open position, supporting a viewing screen 50 relative to an inner surface 26 of the vehicle panel 12, and selectively moving the viewing screen 50 between an internal viewing position and an external viewing position when the vehicle panel 12 is in the open position.

The method may additionally include any of the following steps either alone or in any combination. The method includes coupling the vehicle panel 12 to a vehicle structure 24, moving the vehicle panel to a first open position to provide the internal viewing position, and moving the vehicle panel to a second open position to provide the external viewing position, the first open position being different than the second open position. The method includes coupling one side of the vehicle panel 12 to the vehicle structure 24 with a first coupling mechanism 22a and coupling an opposite side of the vehicle panel 12 to the vehicle structure 24 with a second coupling mechanism 22b. The method includes coupling the viewing screen 50 to the vehicle panel 12 with a screen pivot 60 that allows the viewing screen 50 to be pivoted at least 90 degrees relative to an inner surface 26 of the vehicle panel 12 to provide a plurality of different viewing positions. The method includes enclosing a storage compartment area 14 when the vehicle panel 12 is in the closed position. The method includes covering the inner surface 26 of the vehicle panel 12 with a non-reflective material, such as flat black paint for example, and/or coating a surface 82 of the storage compartment area 14 with a liner material capable of withstanding external weather conditions. The method includes overlaying a rigid cover 68 over a viewing surface 70 of the viewing screen 50 when the vehicle panel 12 is in the closed position, and selectively removing the rigid cover 68 when the vehicle panel 12 is in the open position. The method includes only opening the panel 12 when vehicle 10 is in park and preventing the vehicle 10 from going into drive unless the panel 12 is lowered.

In one example, a plurality of sensors can be used in coordination with the viewing screen 50 and a control system 84 (FIG. 6). The control system 84 comprises one or more controls that are operable to control the power struts 30 and screen pivot 60 to place the screen 50 in the desired position. In one example, the user will control this movement using an input 90 such as a console, key fob, exterior switch, etc. for example, to activate the power strut actuators to move the panel 50 to the open position, and to move the screen 50 to a desired display position.

The one or more controls of the control system 84 can include a processor, memory, and one or more input and/or output (I/O) device interface(s) that are communicatively coupled via a local interface. The one or more controls may be a hardware device for executing software, particularly software stored in memory, and can comprise one or more processing units or any device for executing software instructions. The software in the memory may include one or more separate programs, each of which includes an ordered listing of executable instructions for implementing logical functions.

In one example, the screen 50 is wirelessly, e.g. BLE, linked to the vehicle 10 to monitor a temperature of the screen 50 via at least one temperature sensor T1. This temperature information is communicated to the control system 84 and a signal can be generated if the screen 50 is trending to an over temperature condition so that the vehicle 10 can be moved to more shaded area or turned to face away from the sun.

In one example, one or more interior sensors 86, such as interior and driver facing cameras for example, can measure a height of the driver and passenger and automatically adjust the screen tilt to the correct angle, and/or adjust occupant location position accordingly. In one example, one or more interior sensors 86, such as interior cameras and radar for example, can be used to determine a time averaged angle of a viewer's face and the screen 50 will be tilted to ensure the screen 50 and the viewer's face are parallel. The tilt of the screen 50 can also be based on the reclination angle of the comfort support member if the viewer's face angle is outside of a pre-calibrated range. In one example, interior cameras can detect gestures to control the screen.

In one example, one or more panel sensors 88, e.g. radar/ultrasonic sensors, can be mounted adjacent to the panel 12 and/or compartment storage area 14 to monitor the open position to watch for animals/people accessing the storage area 14. This information can be communicated to the control system 84, which can generate an audible signal to notify that something is accessing the storage area 14.

As discussed above, the panel 12 will only open when vehicle 10 is in park and the vehicle 10 will not go into drive unless the panel 12 is lowered.

In one example, the screen 50 comprises an outdoor monitor that is rated for full sun (e.g., has increased brightness of at least 1700 nits and minimum operating range of −22 degrees F. to 122 degrees F.). In one example, the screen 50 provides for a sealed enclosure to keep out dust and moisture, and has at least a 5 IP rating and a moisture protection rating of at least a 5, for example. The screen 50 may comprise a conformal coated PCB to provide further moisture protection. The screen 50 may also auto fold based on temperature if not in use to keep it out of the sun.

The subject disclosure provides for a viewing screen that is mounted on an inside of a hood panel, with or without fenders, to protect the screen from external elements and theft. The screen is pivotal to allow the screen to swing down to be viewable from the outside. Additionally, there are at least two height levels, a lower position where the screen just rotates down to accommodate a close outside position, and a higher position where the panel rotates further taking the screen higher accommodate a standing position for better viewing from a distance. A powered screen pivot mechanism is provided, which allows the screen to adjust to the interior viewer position/angle and automatically flip down when the panel is raised into the outside conference room mode, e.g. external viewing position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An apparatus comprising:
   a vehicle panel moveable between a closed position and an open position, wherein the vehicle panel has an external surface and an internal surface; and
   a viewing screen supported relative to an inner surface of the vehicle panel, wherein the viewing screen is moveable between an internal viewing position and an external viewing position when the vehicle panel is in the open position, and wherein the viewing screen faces the internal surface of the vehicle panel when the vehicle panel is in the closed position.

2. The apparatus of claim 1, including a coupling mechanism to attach the vehicle panel to a vehicle structure such that, when the vehicle panel is in the open position, the vehicle panel is moveable to a first position for the internal viewing position and a second position for the external viewing position, the first position being different than the second position.

3. The apparatus of claim 2, wherein the coupling mechanism includes a first coupler on one side of the vehicle panel and a second coupler on an opposite side of the vehicle panel.

4. The apparatus of claim 3, wherein the first coupler and the second coupler comprise linkage assemblies with one or more power strut actuators.

5. The apparatus of claim 1, including a screen pivot coupling the viewing screen to the vehicle panel such that the viewing screen is moveable amongst a plurality of viewing positions.

6. The apparatus of claim 5, wherein:
   when in the internal viewing position, the viewing screen is moveable via the screen pivot between at least an upright position and a reclined position that is non-parallel with the upright position, and when in the external viewing position, the viewing screen is moveable via the screen pivot to an outward facing position.

7. The apparatus of claim 6, wherein, when in the internal viewing position, the viewing screen has a lower edge, and wherein when the viewing screen is pivoted from the upright position to the outward facing position the lower edge of the viewing screen becomes an upper edge.

8. The apparatus of claim 5, wherein:

occupant height is measured, and wherein screen tilt angle and/or occupant location position is automatically adjusted to align the viewing screen with an occupant face, or screen tilt angle is automatically adjusted to align the viewing screen with an occupant face in response to detecting a reclined position for an occupant.

9. The apparatus of claim 5, wherein the screen pivot comprises a powered actuator.

10. The apparatus of claim 1, wherein the vehicle panel encloses a compartment when in the closed position.

11. The apparatus of claim 10, wherein the vehicle panel comprises a trunk or frunk.

12. The apparatus of claim 10, wherein the inner surface of the vehicle panel comprises a non-reflective surface, and/or wherein a surface area of the compartment is coated with a liner material that withstands external weather conditions.

13. The apparatus of claim 1, including a rigid cover overlapping a viewing surface of the viewing screen when the vehicle panel is in the closed position, and wherein the rigid cover is selectively removeable when the vehicle panel is in the open position.

14. The apparatus of claim 1, wherein the vehicle panel extends from one edge of a vehicle to an opposite edge of the vehicle and wherein the viewing screen is completely covered by the vehicle panel when the vehicle panel is in the closed position.

15. The apparatus of claim 1, including a securement mechanism that is connected to the vehicle panel to hold the vehicle panel in place during travel and to steady the viewing screen in response to road inputs when the vehicle panel is in the closed position.

16. The apparatus of claim 15, wherein the vehicle panel comprises an outer panel attached to an inner panel that includes reinforcements providing a load path between screen mounting structures and the securement mechanism.

17. A method comprising:

moving a vehicle panel between a closed position and an open position, wherein the vehicle panel has an external surface and an internal surface;

supporting a viewing screen relative to an inner surface of the vehicle panel;

selectively moving the viewing screen between an internal viewing position and an external viewing position when the vehicle panel is in the open position; and positioning the viewing screen to face the internal surface of the vehicle panel when the vehicle panel is in the closed position.

18. The method of claim 17, including coupling the vehicle panel to a vehicle structure, the method further including:

moving the vehicle panel to a first open position to provide the internal viewing position, and moving the vehicle panel to a second open position to provide the external viewing position, the first open position being different from the second open position.

19. The method of claim 18, including coupling one side of the vehicle panel to the vehicle structure with a first coupling mechanism and coupling an opposite side of the vehicle panel to the vehicle structure with a second coupling mechanism.

20. The method of claim 17, including coupling the viewing screen to the vehicle panel with a screen pivot that allows the viewing screen to be pivoted at least 90 degrees relative to an inner surface of the vehicle panel to provide a plurality of different viewing positions.

21. The method of claim 17, including:

measuring occupant height, and automatically adjusting screen tilt angle and/or automatically adjusting occupant location position to align the viewing screen with an occupant face, or automatically adjusting screen tilt angle to align the viewing screen with an occupant face in response to detecting a reclined position for an occupant.

22. The method of claim 21, including covering the inner surface of the vehicle panel with a non-reflective material, and/or coating a surface of a storage compartment area associated with the viewing screen with a liner material that withstands external weather conditions.

23. The method of claim 17, including overlaying a rigid cover over a viewing surface of the viewing screen when the vehicle panel is in the closed position, and selectively removing the rigid cover when the vehicle panel is in the open position.

24. The method of claim 17, wherein the vehicle panel extends from one edge of a vehicle to an opposite edge of the vehicle, and including completely covering the viewing screen with the vehicle panel when the vehicle panel is in the closed position.

25. The method of claim 17, including connecting a securement mechanism to the vehicle panel to hold the vehicle panel in place during travel and to steady the viewing screen in response to road inputs when the vehicle panel is in the closed position.

26. The method of claim 25, wherein the vehicle panel comprises an outer panel attached to an inner panel that includes reinforcements providing a load path between screen mounting structures and the securement mechanism.

* * * * *